United States Patent Office 3,073,772
Patented Jan. 15, 1963

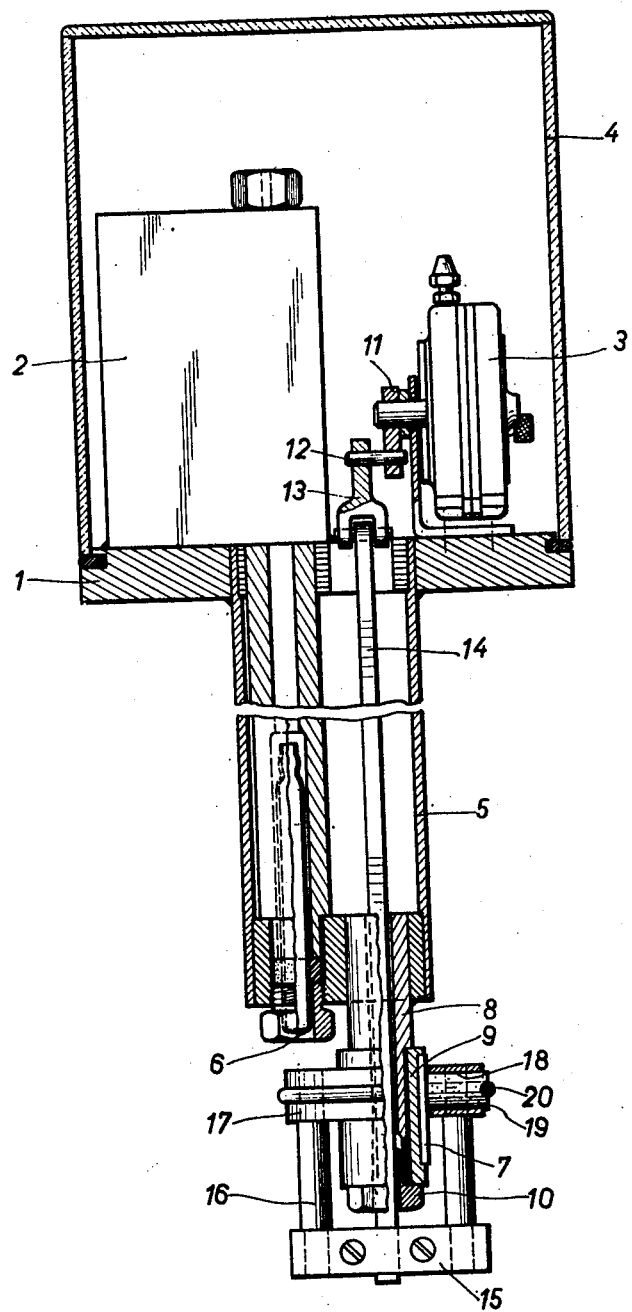

3,073,772
APPARATUS FOR CONTINUOUSLY MEASURING THE POTENTIAL IN A LIQUID AND FOR SIMULTANEOUSLY CLEANING THE MEASURING ELECTRODE
Willy Wirz, Zurich, and Hans Jucker, Kusnacht, Switzerland, assignors to Polymetron A.-G., Zurich, Switzerland
Filed Apr. 1, 1960, Ser. No. 19,359
Claims priority, application Switzerland Apr. 10, 1959
6 Claims. (Cl. 204—195)

The present invention relates to a method and to an apparatus for the continuous potential measuring in liquids with simultaneous cleaning of the measuring electrode. Such methods are generally used for oxygen measurements and for measurements of pH-values. In all these electro-chemical measurements interfering layers or films may form on the active surface of the measuring electrode and such layers or films may impair the precision of the measurements and the comparability of different measurements. In order to keep clean the electrode surface it has been proposed to treat the latter with brushes and/or wipers. In practice the required cleanliness of the electrode surface cannot be obtained thereby. It has also already been proposed to form the measuring electrode of two parts and to rub those two parts continuously one against the other in order to obtain continuous removal of interfering layers on the active electrode surface exposed to the electrolyte. However practice has shown that such a division of the electrode into two parts, in which the rubbing or grinding cleaning elements themselves consist of electrically conducting electrode material may be used in very particular cases only. Whenever the liquid contains for example soaps or oils there is formed between the rubbing surfaces a thin film reducing the friction and this film cannot be removed by the rubbing of smooth-surfaced electrode material. A similar phenomenon appears with cleaning members of organic material. All these materials in many cases lead themselves to the formation of lubricant films or layers or they cannot withstand the chemical attack of the electrolyte.

It is a prime object of the present invention to provide a method for continuously measuring the potential in liquids and for simultaneously cleaning the measuring electrode, in which the above-mentioned drawbacks are completely avoided.

To this end the invention contemplates a method comprising the step of overgrinding the whole surface of the measuring electrode which is active for the measurements continuously with a rough-surfaced body of electrically non-conducting, inorganic material.

It is a further object of the present invention to provide an apparatus for carrying out the afore-mentioned method.

Such an apparatus, according to the invention, comprises a measuring electrode, against the active surface of which is pressed a grinding member carried by a driving holder having a rough working surface and made of electrically non-conducting, inorganic material, said grinding body, upon driving by the holder, continuously grinding the active surface of the measuring electrode thereby cleaning an electrode surface of constant dimension.

The grinding member preferably consists of pressed granulous or fibrous material, for example of glass fibers stone wool, asbestos or the like. It may contain corundum or be formed of pumice stone while the measuring electrode, in accordance with the measurements to be carried out, may consist of previous metal, graphite or of an appropriate metal alloy. The material of the grinding body may contain a synthetic binding agent.

Other features and advantages of the invention will appear from the description now to follow, of preferred embodiments thereof, given by way of example only and in which reference will be made to the sole FIGURE of the accompanying drawing showing an embodiment of an apparatus for carrying out the method of the invention.

The illustrated apparatus comprises a support 1 supporting a casing 2 with a reference electrode not shown and a driving motor 3. The parts 2 and 3 are covered by a glass bell 4 removably supported by the support 1. The dipping portion of the apparatus projects from the lower side of the support 1. This portion includes a cylindrical tube 5 secured to the support 1 and housing, in a manner known per se, a diaphragm 6 influencing the reference electrode and mounted in a separate, downwardly opening, inner channel of the tube 5. At the lower front end of tube 5 there is secured a support for a measuring electrode 7. This support is provided with a tubular piece 8 welded to the tube 5 and stepped outwardly. At its free end the tubular piece 8 is provided with an inner thread. On the stepped portion of the tubular piece 8 there is arranged a sleeve 9 removably held between the tubular piece 8 and a hollow screw 10 screwed into the tubular piece 8. The measuring electrode 7 is mounted into an axially extending outer groove of the sleeve 9. The connecting lead to the measuring electrode is not represented. It may be guided upwardly within or exteriorily of the tube 5.

On the shaft of the motor 3 there is mounted an eccentric 11 having a crank pin 12 guided in a fork 13. The latter is articulated to a push rod 14 extending downwardly through the tube 5, the tubular piece 8 and the hollow screw 10. To the lower end portion of the push rod 14 there is clamped a transverse yoke 15, to which a disc-shaped holder 17 enclosing the sleeve 9 is secured by means of a pair of rods 16. The holder 17 has a peripheral groove and a radial boring 18 receiving a cylindrical grinding body 19. The outer surface of this grinding body 19 has a further groove aligned with the peripheral groove of the holder 17. These grooves receive an O-ring 20 adapted to resiliently press the rough inner working surface of the grinding body 19 against the active surface of the measuring electrode 7.

In operation of the motor 3 the eccentric 11 drives over the fork 13 the push rod 14 which effects a reciprocal motion. The stroke of rod 14 is chosen such that the grinding body 19 continuously rubs over the whole active surface of the measuring electrode thereby leaving always a same area of the electrode surface exposed to the electrolyte into which is dipped the dipping portion of the apparatus. Thereby the active electrode surface remains free from eventual deposits, oxydation products and other interfering layers. Owing to the rough working surface of the grinding body also oil and soap films are removed.

The described method is particularly appropriate for cyan measurements. In such a case there is used a measuring electrode of silver and a grinding body consisting of pressed glass fibers with synthetic resin binding agent.

The method may be used as well for the measurements of a complex potential as also for the measuring of an electrode potential. Likewise it is possible to measure the potential of different redox systems.

Of course the holder carrying the grinding body could also be driven pneumatically. Further the arrangement could also be such that the grinding body effects circular movements instead of the described reciprocation.

I claim:
1. Apparatus for continuously measuring the potential in a liquid comprising an electrode stationary in said liquid, said electrode having a determinable surface area, grinding means of electrically insulating inorganic material for cleaning said electrode, said grinding means hav- ing a surface area which is less than the surface area of the electrode, means coupled to said grinding means for continuously engaging the same with said electrode, and means operatively associated with said grinding means to move the same along said electrode with said electrode measuring said potential.

2. Apparatus as claimed in claim 1 wherein the measured potential is responsive to a working surface which is the difference between the surface area of the electrode and the surface area of the grinding means, said working surface being of constant area.

3. Apparatus as claimed in claim 1 for measuring cyan potential comprising a silver measuring electrode.

4. Apparatus as claimed in claim 1 wherein said means for moving the grinding means comprises a reciprocally movable holder.

5. Apparatus as claimed in claim 4 wherein said holder comprises a ring encircling said electrode, said grinding means including a grinding body radially supported in said ring and contacting said electrode, said ring being provided with an annular groove, said grinding body having a groove at its extremity which is aligned with the first said groove, said means for continuously engaging the grinding means with said electrode comprising an O-ring in said grooves for resiliently urging the grinding body against the electrode.

6. Apparatus as claimed in claim 5 wherein the means for moving the grinding means comprises a push rod coupled to said holder and perpendicular thereto, and means for reciprocally moving said push rod.

References Cited in the file of this patent
UNITED STATES PATENTS

| | | |
|---|---|---|
| 1,912,188 | Gann | May 30, 1933 |
| 2,345,465 | Miles et al. | Mar. 28, 1944 |
| 2,890,406 | Axt et al. | June 9, 1959 |